US008011180B2

(12) United States Patent
Brahma et al.

(10) Patent No.: US 8,011,180 B2
(45) Date of Patent: Sep. 6, 2011

(54) PARTICULATE FILTER REGENERATION

(75) Inventors: Avra Brahma, Dearborn, MI (US); Michiel van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1015 days.

(21) Appl. No.: 11/839,646

(22) Filed: Aug. 16, 2007

(65) Prior Publication Data

US 2009/0044514 A1    Feb. 19, 2009

(51) Int. Cl.
*F01N 3/00*    (2006.01)

(52) U.S. Cl. ............... 60/297; 60/274; 60/277; 60/295; 60/311

(58) Field of Classification Search ............ 60/274, 60/276, 277, 287, 291, 295, 297, 311
See application file for complete search history.

(56) References Cited

U.S. PATENT DOCUMENTS

| | | | |
|---|---|---|---|
| 5,511,413 A | 4/1996 | Pfister et al. | |
| 6,397,587 B1 | 6/2002 | van Nieuwstadt et al. | |
| 6,829,891 B2* | 12/2004 | Kato et al. | 60/297 |
| 6,941,750 B2* | 9/2005 | Boretto et al. | 60/297 |
| 6,947,831 B2 | 9/2005 | van Nieuwstadt | |
| 7,031,827 B2 | 4/2006 | Trudell et al. | |
| 7,065,960 B2 | 6/2006 | Gioannini et al. | |
| 7,140,176 B2* | 11/2006 | Bartsch et al. | 60/276 |
| 7,147,688 B2* | 12/2006 | Kondou et al. | 95/1 |
| 7,159,392 B2* | 1/2007 | Kondoh et al. | 60/297 |
| 7,357,822 B2* | 4/2008 | Hamahata et al. | 55/283 |
| 7,458,206 B2* | 12/2008 | Yahata et al. | 60/297 |
| 7,677,032 B2* | 3/2010 | Berryhill et al. | 60/297 |
| 2003/0167757 A1 | 9/2003 | Boretto et al. | |
| 2004/0139852 A1 | 7/2004 | Koga et al. | |
| 2005/0022519 A1 | 2/2005 | Shirakawa | |
| 2006/0016179 A1 | 1/2006 | Okugawa et al. | |
| 2006/0032217 A1 | 2/2006 | Kondou et al. | |
| 2010/0126145 A1* | 5/2010 | He et al. | 60/286 |

FOREIGN PATENT DOCUMENTS

EP    1669574    6/2006

OTHER PUBLICATIONS

United Kingdom Intellectual Property Office, International Search Report of GB0814427.1, Dec. 8, 2008, 1 page.

* cited by examiner

*Primary Examiner* — Tu Nguyen
(74) *Attorney, Agent, or Firm* — Julia Voutyras; Alleman Hall McCoy Russell & Tuttle LLP

(57) ABSTRACT

A method of operating an engine having a diesel particulate filter in a vehicle is disclosed. In one example, the filter is regenerated in response to a temperature differential across each of a plurality of filter channels. The method can improve the timing of filter regeneration.

16 Claims, 8 Drawing Sheets

PARTICULATE FILTER REGENERATION

BACKGROUND AND SUMMARY

Diesel powertrains may have a particulate filtration system referred to as a Diesel Particulate Filter (DPF), where engine generated soot may be collected. The collection, or loading, of soot leads to an increase in exhaust pressure, which may degrade engine performance. As such, collected soot can be periodically combusted (e.g., regenerated, or purged) to clean the device and reduce the performance impact.

It may be advantageous to vary when a particulate filter is regenerated to reduce fuel consumption and extend filter usable life. In some examples, filter soot loading may be inferred and/or correlated to a measure of filter flow restriction, such as based on upstream and/or downstream pressures. However, the restriction over the DPF may depend heavily on the amount of flow, which in turn may vary with temperature in and around the DPF. Further, since temperature may vary both along the length of the filter and/or across the filter width, especially during transients, using a measure or estimate of DPF temperature and/or exhaust temperature may produce errors, especially during low flow conditions (e.g., idle) where errors in models may be amplified. Such errors may lead to unnecessary regeneration, thus increasing fuel usage and decreasing durability.

Thus, in one approach, the restriction and/or the decision and timing of the regeneration may be correlated to loading taking into account temperature and/or flow distribution along and/or across the DPF. Further, in one embodiment, such correlation may be used during higher flow and/or higher temperature conditions to provide improved accuracy and address the problem of low flow restriction variability.

The inventors herein have recognized the above issues and approaches, which will be more fully described herein with reference to the description and/or figures.

DETAILED DESCRIPTION

Figure 1:
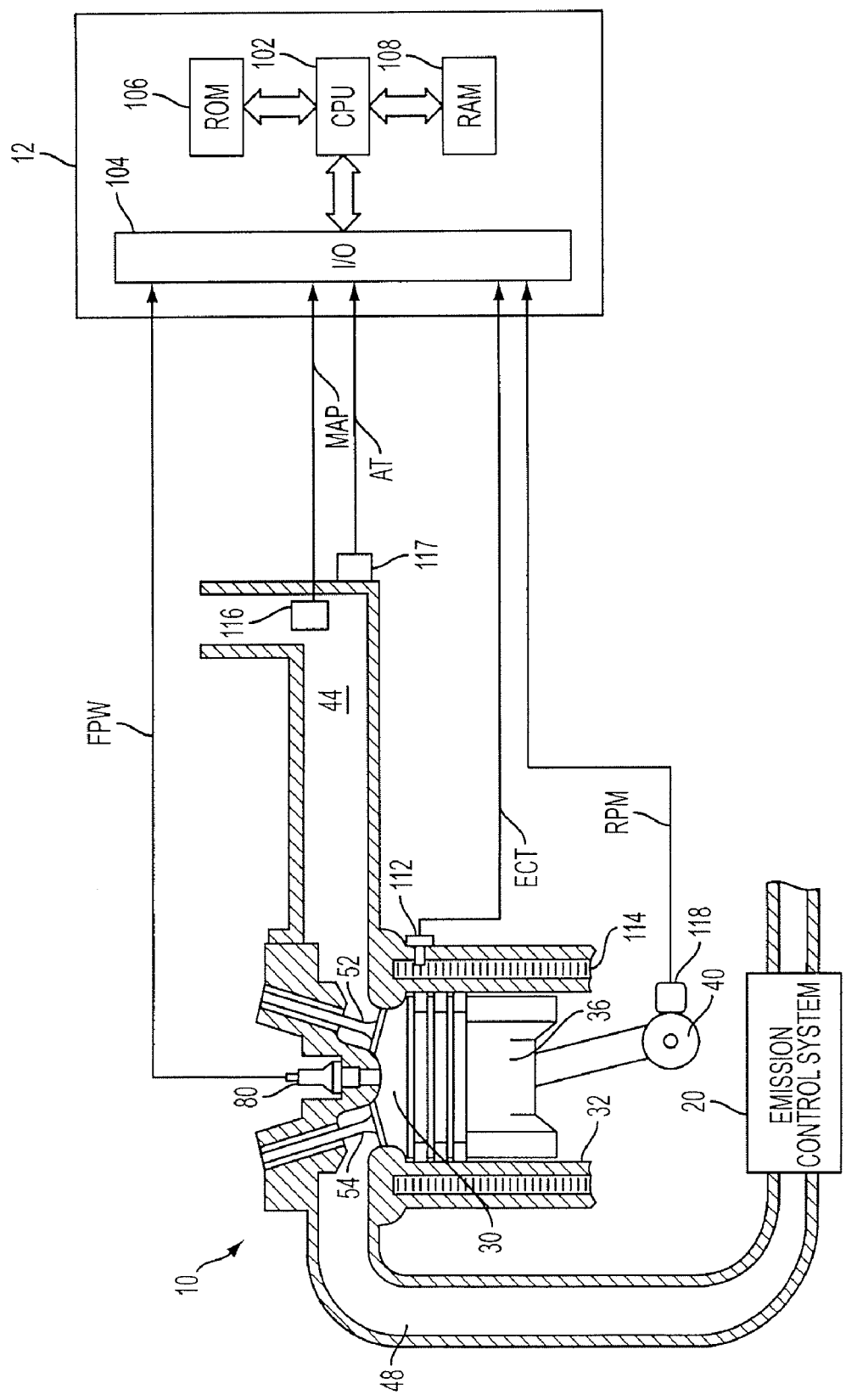
FIG. 1 is a schematic diagram of an engine.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Engine 10 is shown as a direct injection engine with injector 80 located to inject fuel directly into cylinder 30. Fuel is delivered to fuel injector 80 by a fuel system (not shown), including a fuel tank, fuel pump, and high pressure common rail system. Fuel injector 80 delivers fuel in proportion to the pulse width of signal FPW from controller 12. Both fuel quantity, controlled by signal FPW and injection timing may be adjustable. Engine 10 may utilize compression ignition combustion under some conditions, for example.

Controller 12 is shown in FIG. 1 as a microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20 is coupled to an exhaust manifold 48 and several exemplary embodiments of the system in accordance with the present invention are described with particular reference to FIGS. 2A-2C.

In one example, engine 10 may be a diesel fueled engine that operates with stratified charge combustion in excess oxygen conditions. Alternatively, fuel timing adjustments, and multiple fuel injections, can be utilized to obtain homogeneous charge compression ignition combustion. While lean operation may be utilized, it is also possible to adjust engine conditions to obtain stoichiometric or rich air-fuel ratio operation.

In another alternative embodiment, a turbocharger can be coupled to engine 10 via the intake and exhaust manifolds. The turbocharger may include a compressor in the intake and a turbine in the exhaust coupled via a shaft. Further, the engine may include a throttle and exhaust gas recirculation.

Figure 2:
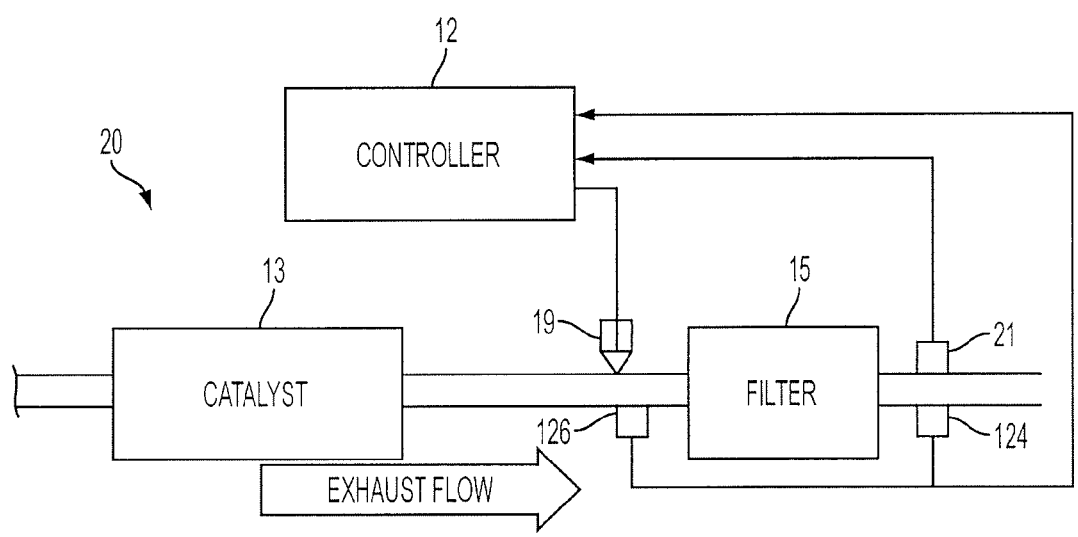
FIG. 2 is a schematic diagram of exemplary emission control system.

Referring now to FIG. 2, the emission control system 20 optionally includes a catalyst system 13 upstream of the particulate filter 15. Various types of catalysts can be optionally used, such as, for example: a urea based Selective Catalytic Reduction (SCR) catalyst, an oxidation catalyst, and/or a NOx absorber, or these catalysts could be combined with the particulate filter. In the case of an SCR catalyst, in one example, it may include a base metal/zeolite formulation with optimum NOx conversion performance in the range of 200-500° C. Reductant, such as aqueous urea, can be stored onboard and injected in the exhaust system upstream of the SCR catalyst. Alternatively, any other structure known to those skilled in the art to deliver reductant to an exhaust gas aftertreatment device may be used, such as late injection in a direction injection type engine.

Alternatively, catalyst system 13 may include (separate or in addition to the SCR catalyst) an oxidation catalyst, which may include a precious metal catalyst, preferably one containing platinum, for rapid conversion of hydrocarbons (HC), carbon monoxide (CO) and nitric oxide (NO) in the engine exhaust gas. The oxidation catalyst may also be used to supply heat in the exhaust system, wherein an exotherm is created when extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or another approach to increase the HC concentration in the exhaust gas. Alternatively, hydrocarbons may be injected directly into the exhaust gas stream entering the oxidation catalyst. Reductant delivery system 19 may be used to deliver HC from the fuel tank or from a storage vessel to the exhaust system to generate heat for heating the particulate filter 15 for regeneration purposes.

Particulate filter 15, in one example a diesel particulate filter (DPF), may be coupled downstream of the catalyst system and may be used to trap particulate matter (e.g., soot) generated during the drive cycle of the vehicle. The DPF can be manufactured from a variety of materials including cordierite, silicon carbide, and other high temperature oxide ceramics. Once soot accumulation has reached a predetermined level, regeneration of the filter can be initiated. Filter regeneration may be accomplished by heating the filter to a temperature that will burn soot particles at a faster rate than the deposition of new soot particles, for example, 400-600° C. In one example, the DPF can be a catalyzed particulate filter containing a washcoat of precious metal, such as Platinum, to lower soot combustion temperature and also to oxidize hydrocarbons and carbon monoxide to carbon dioxide and water.

Further note that a temperature sensor 21 is shown coupled to the DPF. The sensor, or additional temperature sensors, could also be located within the DPF, or upstream of the filter, or DPF temperature (or exhaust temperature) can be estimated based on operating conditions using an exhaust temperature model. In one particular example, multiple temperature sensors can be used, e.g. one upstream and one downstream of the DPF.

Also, a differential pressure signal ($\Delta p$) is shown being determined from pressure sensors 124 and 126. Note that a single differential pressure can also be used to measure the differential pressure across DPF 15. A single port gauge pressure sensor (SPGS) may also be used. In yet another alternative embodiment, the DPF can be located in an upstream location, with an optional catalyst (or catalysts) located downstream.

As will be appreciated by one skilled in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12.

Figure 3:
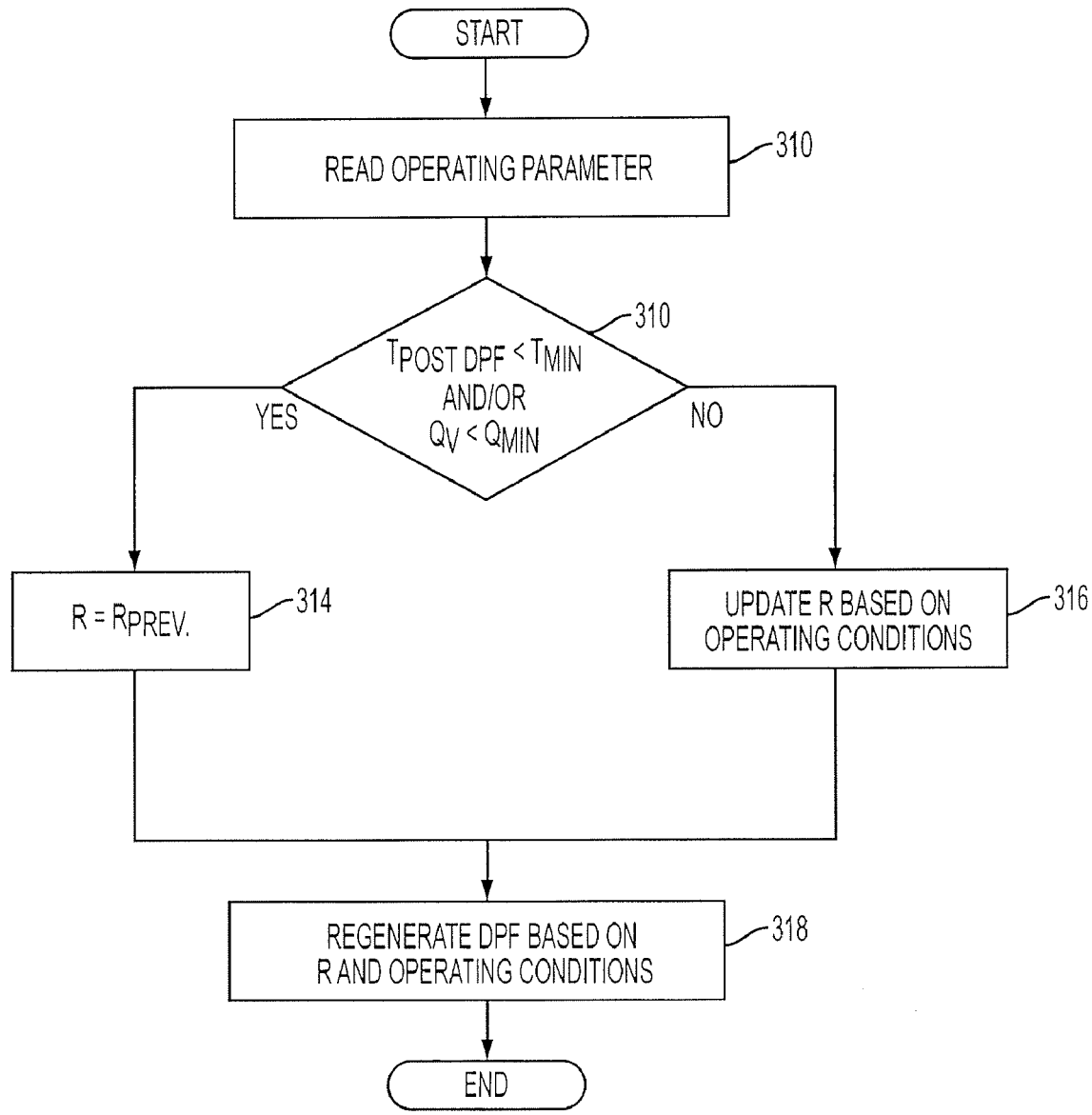
FIGS. 3 and 7 are example routines for managing particulate filter regeneration.

Referring now to FIG. 3, a routine is described for controlling particulate filter regeneration, such as based on a determined flow restriction that may be correlated to soot loading. In one example, where restriction over the DPF depends heavily on volumetric flow, which in turn depends on temperature, a distributed correlation may be used. Temperature (and restriction) may be modeled as a distributed quantity over the length of the DPF, especially during transients, rather than a single "lumped" temperature/restriction. However, this is just one approach, and various other may be alternatively used, or used in additional to distributed temperature modeling.

While improved determinations of the restriction using a distributed approach can provide more appropriately timed DPF regeneration, errors may still persist in the determination. Further, in some cases, such improved estimation approaches may not be used due to timing restrictions, processing power restrictions, system degradation, etc. As such, flow variability may persist. Thus, alternatively, or in addition, the DPF scheduling routine of FIG. 3 may impose conditions to be satisfied before the updating and/or applying an estimate of flow restriction. Specifically, the routine may limit updating the measured restriction only when post DPF temperature>minimum threshold and exhaust volumetric flow rate>minimum threshold.

Specifically, first in 310, the routine reads operating parameters, such as differential pressure temperatures, etc.

Then, in 312, the routine determines whether the temperature downstream of the DPF (T_postDPF) is less than a minimum temperature value (T_min) and whether exhaust volumetric flow (Q_v) is less than a minimum flow value (Q_min). Alternatively, the routine may determine whether temperature downstream of the DPF (T_postDPF) is less than a minimum temperature value (T_min) or whether exhaust volumetric flow (Q_v) is less than a minimum flow value (Q_min).

If the answer to 312 is yes, the routine continues to 314 to freeze the estimated restriction value (R) at its previous vale (R_prev), which would be zero upon initialization. Otherwise, the routine continues to 316 to update the estimated restriction (R) based one or more approaches, such as using a Darcy model, and/or a distributed model as described below with regard to FIGS. 4-6. Further, in one particular example, a filter constant, which is a function of the temperature gradient across the particulate filter) may be used to modify a restriction value, where the restriction is based on Darcy's law, as noted below. Alternatively, the filter constant may be used with a simplified lumped model may also be used Next, in 318, the routine regenerates the DPF based on the determination of 310, such as by increasing exhaust temperature to a regeneration temperature. The exhaust temperature may be increased, as noted herein, by increasing throttling, late injection, etc. Additionally, the routine may further identify degradation based on the soot loading, such as degradation of the particular filter, and indicate such degradation to an operator, and/or set a code that can be communicated from the vehicle controller.

While the routine of FIG. 3 imposes the flow and temperature boundary conditions, various alternative approaches may also be used. For example, such conditions may be avoided in some examples by using alternative estimation techniques, such as described with regard to FIGS. 7-8.

Figure 4:
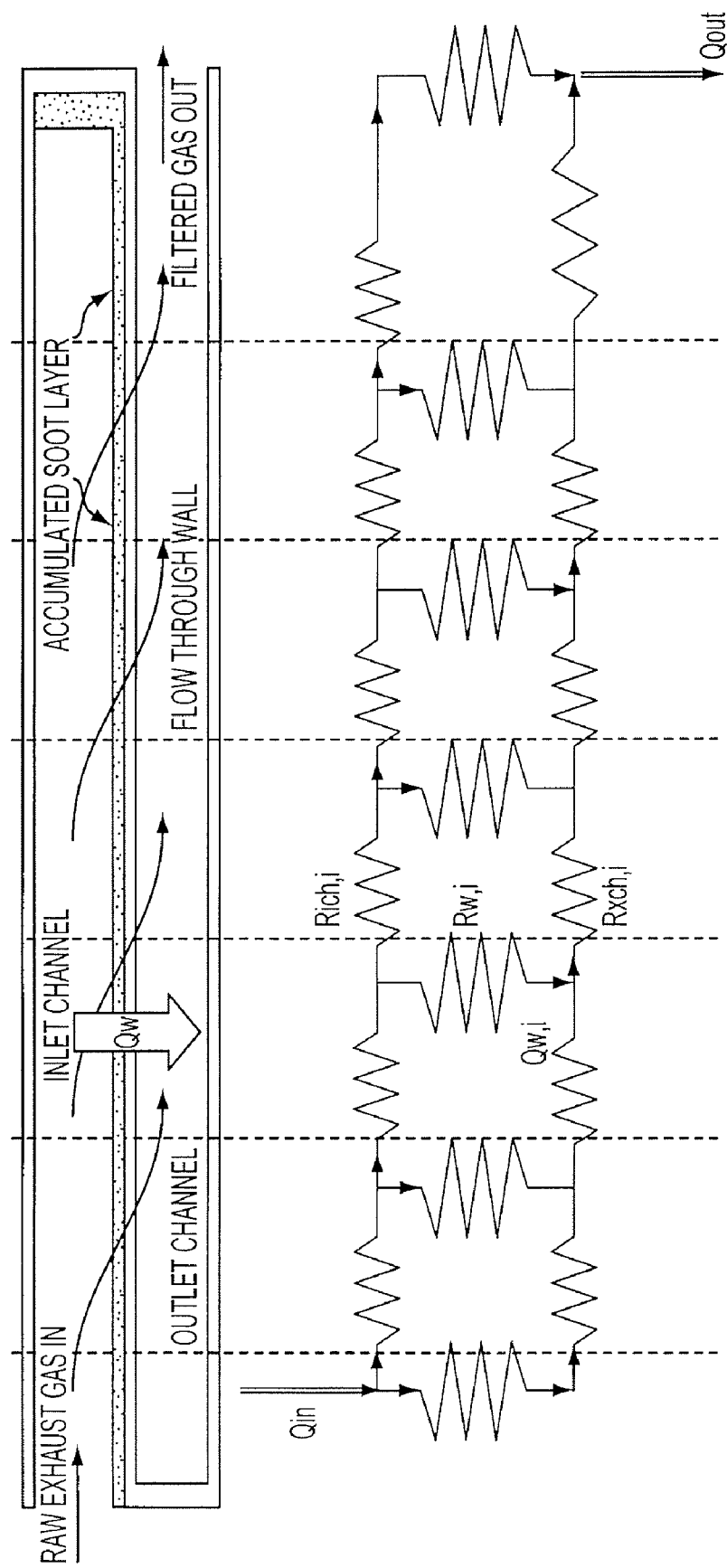
FIG. 4 shows an example flow model for a DPF.
Figure 5A:
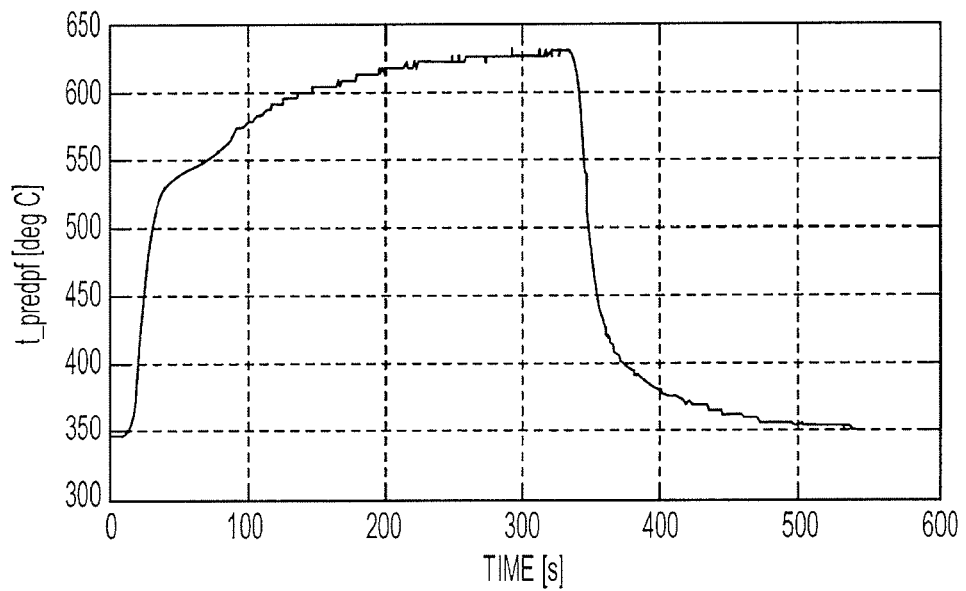
FIGS. 5-6, and 8 show example filter flow data.
Figure 5B:
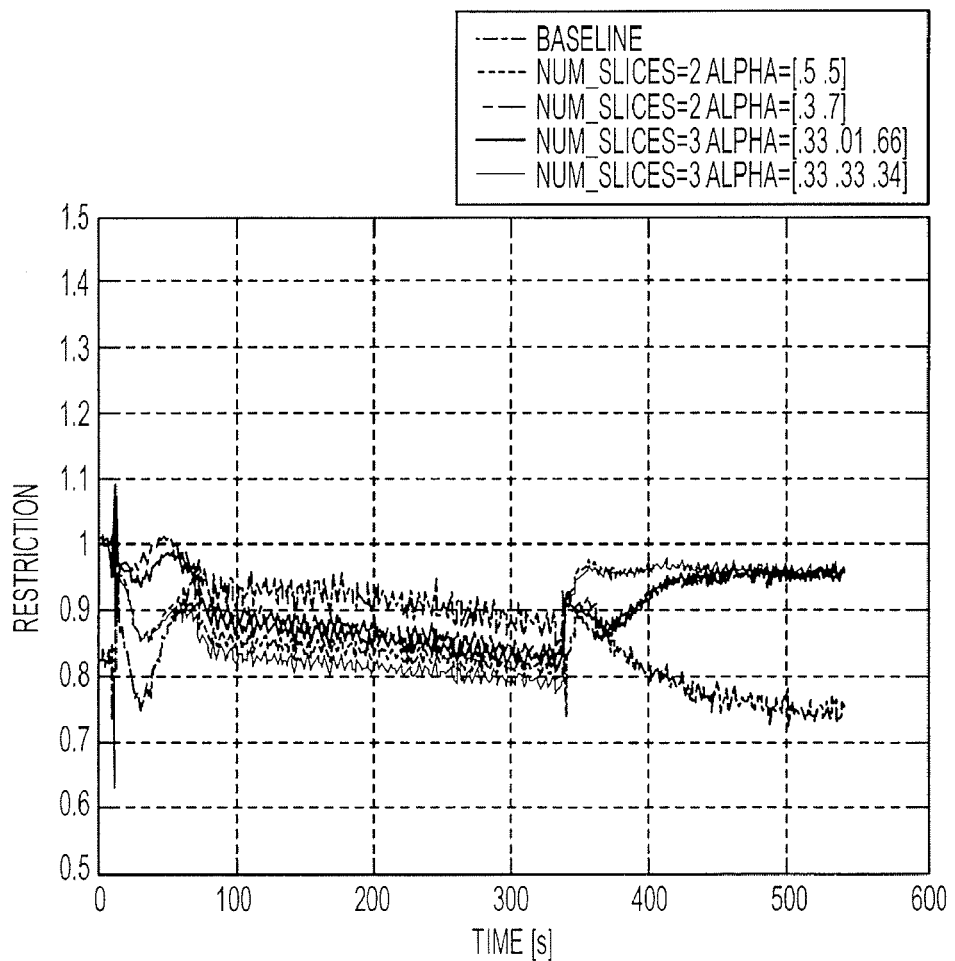

Turning now to FIGS. 4-7, information is provided relating to determining flow restriction in a DPF using a distributed approach. Specifically, distributed temperature/flow of the DPF may be modeled as illustrated in FIG. 4, and then used to obtain a more accurate restriction correlation. The figure shows an example model of the DPF flow using a circuit analogy. The DPF is approximated as several "parallel" segments exposed to different temperatures, where the temperature of each layer may be a function of inlet and outlet temperature, and each layer is exposed to a fraction of the total flow (e.g., a fraction of the total flow passes through each layer). Darcy's law may be applied to this system, in which:

$$q=(k/\mu)(dp/dx)=(k/\mu)(\Delta p/x),\ q=v_w[m/s],\ k=m^2$$

$$\Delta p=xq(\mu/k)=q(x\mu/k),\ \Delta p=\text{wall pressure drop}$$

$$V=IR$$

$$R_{w,i}=x_i\mu(T_i)/k$$

where:
q=heat transfer
k=area
p=pressure
x=distance
μ is viscosity
R=restriction
V=flow In one example, DPF flow can be assumed to be comprised of multiple (n=number of slices>=2) flow paths. Lumping channel losses with wall losses, the network of FIG. 4 reduces to a simple parallel network of restrictions (however, in an alternative embodiment, channel losses may be separately modeled). The equivalent restriction can then be calculated as $$1/R_{soot,eq} = 1/R_1 + 1/R_2 + 1/R_3 + 1/R_4 + \ldots + 1/R_n = \Sigma(1/Ri),$$

$$R_i = (\Delta p - c0 - c2 * \rho(Ti) * Qi^2))/c1\mu(Ti)Qi,$$

where μ is viscosity and ρ is density $Qi = \alpha_i * mexh/\rho(Ti)$, mexh=exhaust mass flow rate, $\alpha_i$ belongs to $\{\alpha_1, \alpha_2, \alpha_3, \alpha_4, \ldots, \alpha_n\}$, $\Sigma\alpha_i = 1$, which then dictates the fraction of flow seeing temperature Ti.

Ti=T(i,t), where, assuming linear temperature drop between Tin and Tout,

T(i,t)=Tin(t)+(i−1)(Tout(t)−Tin(t))/(n−1), i=1, 2, . . . , n

The coefficients c0, c1, and c2 can be obtained from experimental flow testing of the DPF. Further, the density and viscosity of exhaust gas can be estimated based on exhaust gas temperature and experimental test data. The restriction $R_i$ is a monotonic function of the soot load in grams/liter. In this way, measured pressure across the DPF can be correlated to a restriction.

Note that taking a linear temperature profile is without loss of generality. It can be interpreted as adopting a non-linear (e.g. logarithmic) axial grid spacing that samples the linear increments of temperature. Since the results do not (explicitly) depend on axial length, the grid spacing can change dynamically.

Figure 6A:
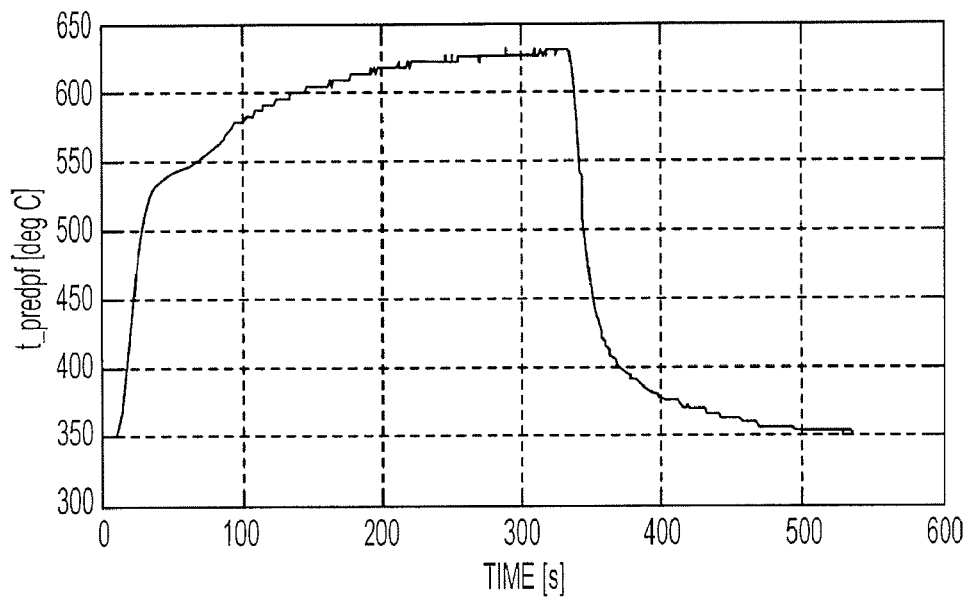
Figure 6B:
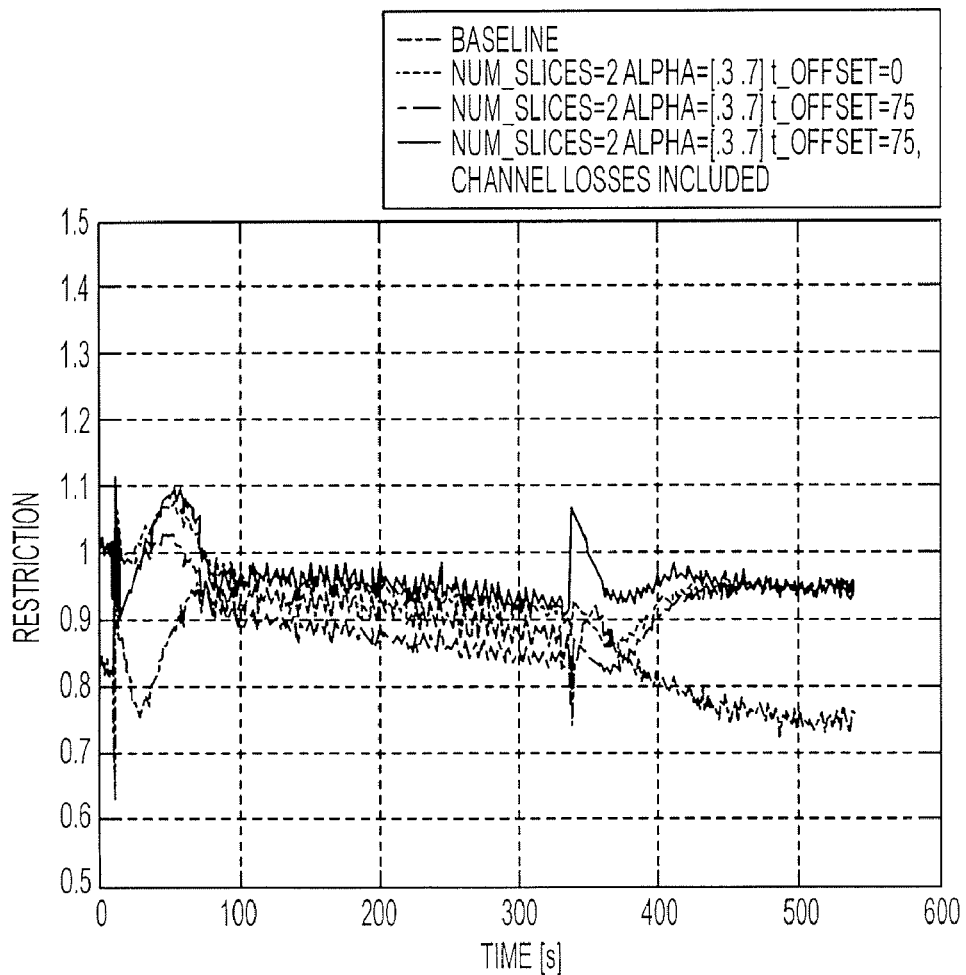

FIG. 6 shows example simulation results for different numbers of slices (2,3) and different distribution of flow at different temperatures (α) The graph shows a normalized restriction (where the restriction is artificially normalized to 1 by dividing by the first value R(0). A comparison metric (100*σ(R)/μ(R)) can be generated for each simulation, which is independent of normalization constant of the restriction and provides a measure of the variance in the restriction.

| Case | num_slices | alpha | Metric (%) |
|------|------------|-------|------------|
| 0 | 1 | N/A* | 7.9762 |
| 1 | 2 | [.5 .5] | 6.9653 |
| 2 | 2 | [.3 .7] | 5.4673 |
| 3 | 3 | [.1 .1 .8] | 6.2697 |
| 4 | 3 | [.33 .01 .66] | 5.7001 |
| 5 | 3 | [.45 .1 .45] | 7.5119 |
| 6 | 3 | [.01 .33 .66] | 6.4144 |
| 7 | 3 | [.33 .33 .34] | 8.1006 |
| 8 | 3 | [.45 .33 .22] | 8.7540 |
| 9 | 3 | [.1 .45 .45] | 7.0568 |
| 10 | 3 | [.33 .45 .22] | 8.2187 |
| 11 | 3 | [.45 .45 .1] | 8.8337 |

As indicated above, it may be possible to further improve the correlation between flow restriction and loading by including channel losses. As indicated below, by including the channel losses, the restriction calculation may be further stabilized. Specifically, the correlation may be modified to include the temperature offset between gas at the end of the inlet channel and the exit temperature (t_postdpf). The offset exists for heat transfer to occur at the wall towards dpf outlet, and affects the results as shown in the simulation data of FIG. 6 and table below.

Specifically, the channel losses may be modeled as:
dΔp=4f*(dx_dpf/D_cell)*(½)ρV(x_dpf)^2, where f=64/Re (Reynolds number), since channel Re<2000 almost always, and 0<x_dpf<L_dpf, and Δpchannel_loss=∫dΔp.

The temperature offset between gas at the end of the inlet channel and the exit temperature (t_postdpf) may be modeled as:

T(i,t)=Tin(t)+(i−1)(T_offset(t)+Tout(t)−Tin(t))/(n−1), where I=1, 2, . . . , n, A is a constant offset of 75 deg C. The simulation data including channel losses used n=2 slices with alpha=[0.3 0.7], and again R artificially normalized to 1, with the same comparison metric. As indicated, including the channel losses further improved the correlation.

| Case | t_offset_c | channel loss | Metric (%) |
|------|-----------|--------------|------------|
| 0 | N/A | N/A | 7.9762 |
| 1 | 0 | Not incl. | 5.4673 |
| 2 | 75 | Not incl. | 4.4815 |
| 3 | 75 | included | 3.8158 |

Figure 7:
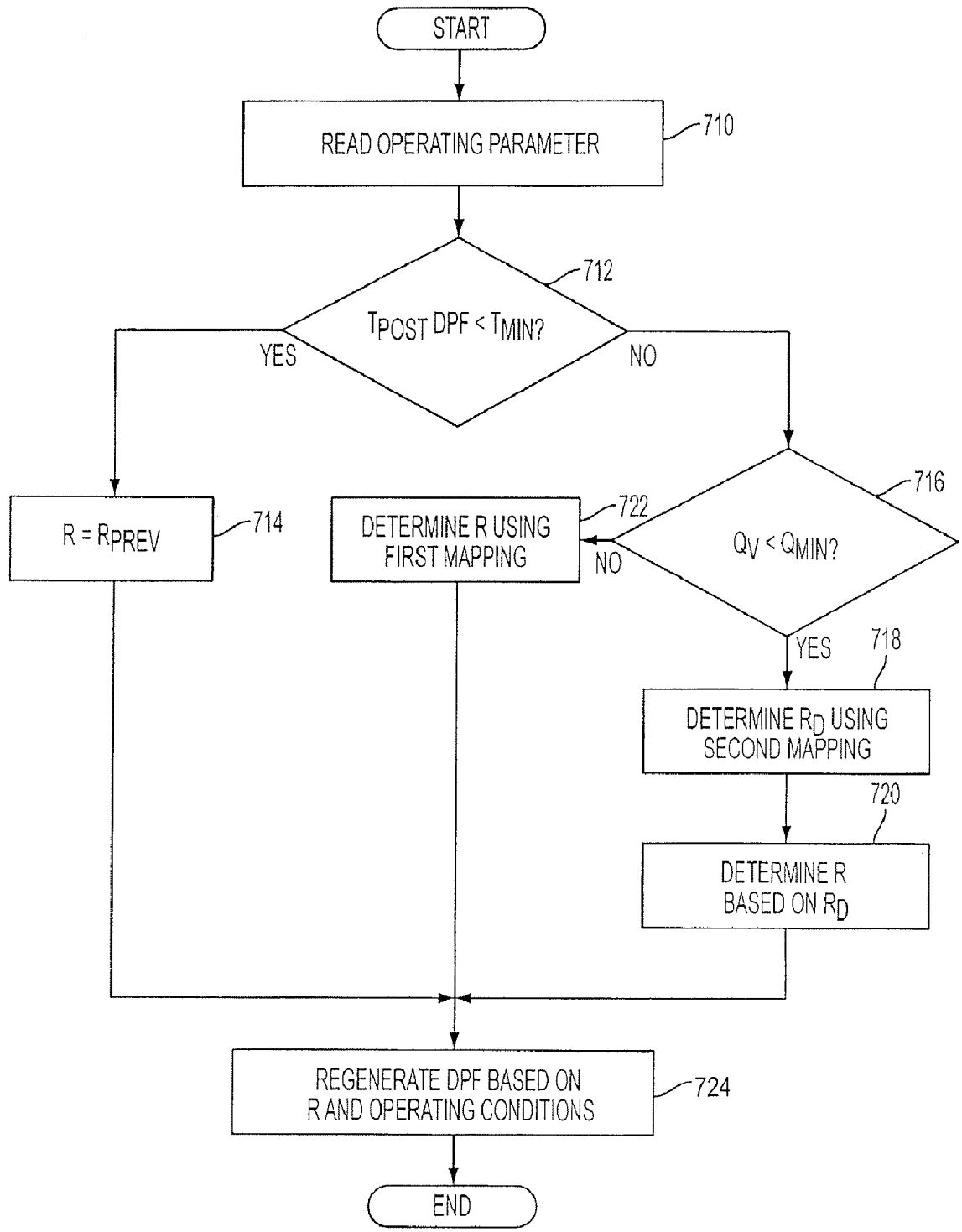
Figure 8:
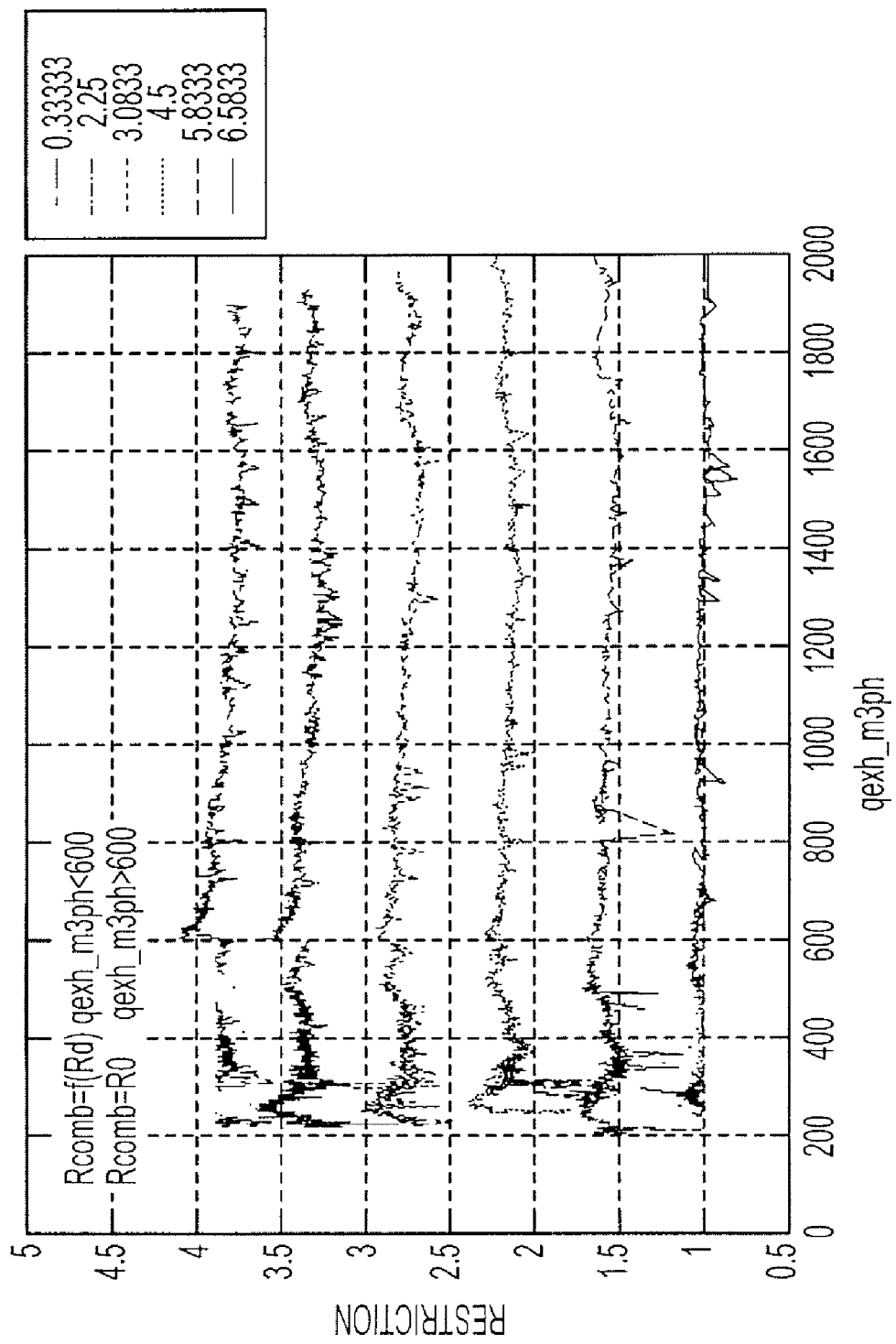

Referring now to FIGS. 7-8, still another approach to determining filter restriction is provided. In particular, the approach may include applying a Darcy model to gas flows for lower flow soot load estimation. Specifically, variability at lower flows can be avoided during in some examples by avoiding determining the restriction estimate at such conditions (as noted in FIG. 3) and using a lumped parameter estimate in the example where temperature gradients may be an in-significant noise factor for high-flow restriction variability. However, during lower flow conditions such as idle or tip-out, the restriction is frozen and as such may not be updated for a significant duration, depending on the vehicle drive cycle, such as during an extended idle.

Thus, in still another approach, a first mapping approach (which may include a first estimation routine) can be used during higher flow and higher temperature conditions, and an alternative mapping may be used during lower flow (and/or lower temperature) conditions, such as described with regard to FIG. 7. For example, the approach of FIGS. 4-6 may be used during the higher conditions, or other mappings may be used, as noted below.

Specifically, FIG. 7 shows an example flow chart of a routine that may be used. During higher flow conditions, a lumped approach may be used. However, during lower flow conditions, a mapping using Darcy's law and a linear transformation may be used, where:

$$R_D = \left(\frac{1}{p_1 Q_{exh}\mu}\right)\frac{(p_1^2 - p_2^2)}{2R_{D0}}, \text{ with } Rd0 = 1.44e5$$

where p1 is upstream DPF pressure, p2 is downstream DPF pressure, and Qexh is exhaust flow, and:

the linear transformation follows the equation, R=RD*1.79−0.78. Note that the value Rd0 may vary with system component specifications. In particular, Rd0 represents a normalization constant Rd for a clean (no soot) DPF to a fixed number, e.g. 1. This also applies to the linear transformation.

Then, during higher flow conditions, the restriction may be determined as:

$$R=(\Delta p-c0-c2*\rho(T)*Qexh^2))/c1\mu(T)Qexh.$$

Specifically, referring to FIG. 7, in 710, the routine reads operating parameters, such as differential pressure, temperatures, flow (e.g. engine flow), etc.

Then, in 712, the routine determines whether the temperature downstream of the DPF (T_postDPF) is less than a minimum temperature value (T_min). If so, the routine continues to 714 to freeze the estimated restriction value (R) at its previous vale (R_prev), which would be zero upon initialization. Otherwise, the routine continues to 716 to determine whether exhaust volumetric flow (Q_v) is less than a minimum flow value (Q_min). If so, the routine continues to 718 to determine RD using the above second mapping, and then in 720, transforms RD to R using the linear transformation. Alternatively, when the answer to 716 is no, the routine continues to 722 to determine the restriction (R) based on a first mapping, such as illustrated above using parameters c0, c1, and c2. From either 722, 720, or 714, the routine continues to 724 to determine whether to regenerate the DPF based on R and various operating conditions, such as vehicle speed, ambient temperature, desired engine output, etc.

Referring now to FIG. 8, data illustrates results for the approach illustrated in FIG. 7, where different sized restrictions are shown versus mass flow for a 6.4 L engine having a 9"×12" sized DPF. The data illustrate that the combination of different estimation routines for different flow and/or temperature conditions can provide improved estimation results for determining flow restriction of a DPF in an engine exhaust.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine having a particulate filter with a length and depth in a vehicle, comprising:
    during a higher flow condition, performing particulate filter regeneration in response to a first soot loading estimate using a plurality of channel restriction estimates based on each particulate filter channel; and
    during a lower flow condition, performing particulate filter regeneration in response to the first soot loading estimate using a linear transformation of particulate filter restriction.

2. The method of claim 1 where the filter regeneration using the plurality of channel restriction estimates based on each particulate filter channel is in response to temperature variation across at least one of the length and depth of the particulate filter.

3. The method of claim 2 where the filter regeneration using the plurality of channel restriction estimates based on each particulate filter channel is in response to flow variation across the length and depth of the particulate filter, the flow variation in response to the temperature variation.

4. The method of claim 3 further comprising determining soot loading based on the flow variation and temperature variation in the plurality of channel restriction estimates based on each particulate filter channel.

5. The method of claim 4 further comprising determining soot loading based on exhaust pressure in the linear transformation of particulate filter restriction.

6. The method of claim 5 further comprising determining degradation of the particulate filter based on the soot loading.

7. The method of claim 5 where the temperature variation is provided across a plurality of portions of the particulate filter.

8. A method of operating an engine having a diesel particulate filter in a vehicle, the particulate filter having a length, a depth, and a plurality of channels, comprising:
    performing particulate filter regeneration in response to channel temperature variation across at least one of a length and depth of each channel of the plurality of channels of the particulate filter;
    performing the particulate filter regeneration in response to flow variation across the length and depth of each channel of the plurality of channels of the particulate filter, the flow variation in response to the temperature variation; and
    determining soot loading of each channel of the plurality of channels of the particulate filter based on the flow variation and temperature variation, the soot loading based on flow variation and temperature variation further determined during selected operating conditions, the selected operating conditions including when temperature downstream of the filter is greater than a first threshold and exhaust flow is greater than a second threshold.

9. The method of claim 1 where the channel temperature variation is provided across a plurality of portions of the particulate filter.

10. The method of claim 1 where the channel temperature variation is estimated via a non-linear profile.

11. The method of claim 1 further comprising determining soot loading based on exhaust pressure during other operating conditions.

12. The method of claim 11 further comprising determining degradation of the particulate filter based on the soot loading.

13. The method of claim 11 where the particulate filter regeneration is performed responsive to temperature variations across the length and depth of each channel of the plurality of channels of the particulate filter.

14. The method of claim 11 where the soot loading is determined taking into account channel flow losses of the particulate filter.

15. A system for a vehicle, comprising:
    a particulate filter coupled in an exhaust of the vehicle, and
    a control system configured to perform particulate filter regeneration in response to an accounting of each temperature variation across each channel of a plurality of flow channels along a length of the particulate filter, the temperature variation generating flow variation along the length of the particulate filter, where the control system accounts for the flow variation in determining soot loading of the filter, the control system further determining soot loading based on the flow variation and temperature variation, the soot loading based on flow variation and temperature variation further determined during selected operating conditions, the selected operating conditions including when temperature downstream of the filter is greater than a first threshold and exhaust flow is greater than a second threshold.

16. The system of claim 15 where the control system determines the temperature variation across a plurality of portions of the particulate filter.

* * * * *